US011537776B2

(12) United States Patent
Chen et al.

(10) Patent No.: US 11,537,776 B2
(45) Date of Patent: Dec. 27, 2022

(54) COMPUTER-IMPLEMENTED METHOD OF PERFORMING VOLTAGE RULE CHECK IN AN ELECTRONIC DESIGN AUTOMATION PLATFORM

(71) Applicant: Powerchip Semiconductor Manufacturing Corporation, Hsinchu (TW)

(72) Inventors: Chun-Sheng Chen, Taipei (TW); Yu-Chih Chen, Hsinchu County (TW)

(73) Assignee: Powerchip Semiconductor Manufacturing Corporation, Hsinchu (TW)

( * ) Notice: Subject to any disclaimer, the term of this patent is extended or adjusted under 35 U.S.C. 154(b) by 0 days.

(21) Appl. No.: 17/373,790

(22) Filed: Jul. 13, 2021

(65) Prior Publication Data
US 2022/0245316 A1  Aug. 4, 2022

(30) Foreign Application Priority Data
Feb. 2, 2021  (TW) ................................ 110103821

(51) Int. Cl.
*G06F 30/398* (2020.01)
*G06F 30/367* (2020.01)
*G06F 30/31* (2020.01)
*G06F 119/06* (2020.01)

(52) U.S. Cl.
CPC ............ *G06F 30/398* (2020.01); *G06F 30/31* (2020.01); *G06F 30/367* (2020.01); *G06F 2119/06* (2020.01)

(58) Field of Classification Search
CPC ...................................................... G06F 30/398
USPC .......................................................... 716/122
See application file for complete search history.

(56) References Cited

U.S. PATENT DOCUMENTS

| 10,303,839 B2 | 5/2019 | Kekare | |
| 2009/0083690 A1* | 3/2009 | Habib | G06F 30/392 716/104 |
| 2016/0012168 A1* | 1/2016 | Chen | G06F 30/33 716/107 |

FOREIGN PATENT DOCUMENTS

| CN | 111967217 A | 11/2020 |
| TW | 201743231 A | 12/2017 |

* cited by examiner

*Primary Examiner* — Eric D Lee
(74) *Attorney, Agent, or Firm* — Winston Hsu

(57) ABSTRACT

A computer-implemented method of performing voltage rule check in an electronic design automation (EDA) platform is provided in the present invention, including steps of inserting pseudo device with safe operating area (SOA) model setting in a netlist generated by the EDA platform or in a schematic of process design kit (PDK), wherein parameters of the pseudo device and the model are set so that the pseudo device would not affect original circuits in the netlist and the schematic, performing SOA check in the netlist or the schematic through the EDA platform, and examining the warning messages triggered by the pseudo device and the model violating the SOA setting in the SOA check to find out layout sections violating the SOA setting.

11 Claims, 17 Drawing Sheets

```
C2_9112  VDDCORE:174 EN:1 2.49728e-19
C2_9387  VDDCORE:198 EN:2 2.04769e-19
C2_9431  VDDCORE:205 EN:3 2.95226e-20
C2_9433  VDDCORE:205 EN:1 2.17898e-17
C2_9434  VDDCORE:205 EN:2 2.0021e-18
C2_11222 VDDCORE:427 EN:1 4.47758e-19
C2_11223 VDDCORE:427 EN:2 4.60356e-18
C2_12750 VDDCORE:803 EN:1 4.08577e-19
C2_12751 VDDCORE:803 EN:2 6.49652e-18
C1_16906 VSSCORE:224 EN:3 2.36527e-19
C1_17448 VSSCORE:250 EN:3 2.05613e-18
C1_17449 VSSCORE:250 EN:1 1.9396e-19
C1_17448 VSSCORE:250 EN:3 2.05613e-18
C1_17449 VSSCORE:250 EN:1 1.9396e-19
C1_17461 VSSCORE:251 EN:3 2.12767e-18
C1_17539 VSSCORE:259 EN:3 2.17741e-18
```

FIG. 2 warning(filename:line number) resulted during SOA check
<node voltage name> (=val) of <device/element name> has exceeded
<node voltage name>_max (=val)

To turn it off use .option WARN=0

Example Warnings
Warning (res1 : r1) : Vr = 1.00          has exceeded Bv_max = 0.900
Warning (cap1 : c1) : Vr = 1.00          has exceeded Bv_max = 0.900
Warning (dio1 : d1) : Vr = 1.00          has exceeded Bv_max = 0.900
Warning (bjt1 : q_gp1) : Vbe = 1.00 has exceeded Vbe_max = 0.800
Warning (mos49 : m1) : Vgs = 1.00 has exceeded Vgs_max = 0.900
Warning (mos49 : m1) : Vgb = 1.00 has exceeded Vgs_max = 0.900
Warning (mos49 : m1) : Vds = 1.00 has exceeded Vds_max = 0.900
Warning (mos49 : m1) : Vbd = -1.00 has exceeded Vbd_max = 0.900

FIG. 4

C2_9112 VDDCORE:174 EN:1 2.49728e-19
C2_9387 VDDCORE:198 EN:2 2.04769e-19
C2_9431 VDDCORE:205 EN:3 2.95226e-20
C2_9433 VDDCORE:205 EN:1 2.17898e-17
C2_9434 VDDCORE:205 EN:2 2.0021e-18
C2_11222 VDDCORE:427 EN:1 4.47758e-19
C2_11223 VDDCORE:427 EN:2 4.60356e-18
C2_12750 VDDCORE:803 EN:1 4.08577e-19
C2_12751 VDDCORE:803 EN:2 6.49652e-18
Cvrc100 VDDCORE EN 1E-20 bv_max=2   ← 501
C1_16906 VSSCORE:224 EN:3 2.36527e-19
C1_17448 VSSCORE:250 EN:3 2.05613e-18
C1_17449 VSSCORE:250 EN:1 1.9396e-19
C1_17448 VSSCORE:250 EN:3 2.05613e-18
C1_17449 VSSCORE:250 EN:1 1.9396e-19
C1_17461 VSSCORE:251 EN:3 2.12767e-18
C1_17539 VSSCORE:259 EN:3 2.17741e-18   502
Cvrc200 VSSCORE EN 1E-20 by_max=2   ←

FIG. 5

```
+pkt2 = 1.6E-4              ua1 = 5.9E-10              lua1 = 4E-12
+wua1 = -1.18E-10           pua1 = 8.6E-12             ub1 = -5E-19
+uc1 = 1.5E-10              luc1 = -9E-12              wuc1 = -2.1E-11
+puc1 = 1.4E-12             at = 3.3E4                 wat = 6.3E3
+prt = 0                    njs = 0.88241              xtis = 3
+tpb = 1.6047E-3            tpbsw = 1.453E-3           tpbswg = 1.485E-3
+tcj = 8.7372E-4            tcjsw = 1.8361E-5          tcjswg = 9.0085E-4
+tvoff = 1.4E-3
***** Well Proximity Effect Model Parameters ***
+web = 0                    wec = 0                    kvth0we = 0
+k2we = 0                   ku0we = 0                  scref = 1E-6
***** SOA Parameters ***
```

+Vgs_max = 1    Vgd_max = 1    Vgb_max = 1    ~901
+Vds_max = 1    Vbs_max = 1    Vbd_max = 1

FIG. 9

```
* intrinsic inverter ring oscillator
*simulator lang=spice insensitive=yes
.option accurate post=2
.option warn=1
.temp 25
.GLOBAL VDD .lib 'hv55_1p2v_6v_32v_v0p95.1ib' mos_tt
.lib 'hv55_1p2v_6v_32v_v0p95.1ib' tt_dio
.lib 'hv55_1p2v_6v_32v_v0p95.1ib' res_tt
.lib 'hv55_1p2v_6v_32v_v0p95.1ib' tt_bjt
.lib 'hv55_1p2v_6v_32v_v0p95.1ib' mom_tt
.lib 'hv55_1p2v_6v_32v_v0p95.1ib' var_tt .param dwn=4u dwp=6u dlp=0.054u dln=0.054u
X01 n00 n01 Inv pl=dlp pw=dwp nl=dln nw=dwn
X02 n01 n02 Inv pl=dlp pw=dwp nl=dln nw=dwn
X03 n02 n03 Inv pl=dlp pw=dwp nl=dln nw=dwn
X04 n03 n04 Inv pl=dlp pw=dwp nl=dln nw=dwn
X05 n04 n05 Inv pl=dlp pw=dwp nl=dln nw=dwn
X06 n05 n06 Inv pl=dlp pw=dwp nl=dln nw=dwn
X07 n06 n07 Inv pl=dlp pw=dwp nl=dln nw=dwn
X08 n07 n08 Inv pl=dlp pw=dwp nl=dln nw=dwn
X09 n08 n09 Inv pl=dlp pw=dwp nl=dln nw=dwn
X10 n09 n10 Inv pl=dlp pw=dwp nl=dln nw=dwn
X11 n10 n00 Inv pl=dlp pw=dwp nl=dln nw=dwn .SUBCKT Inv INPUT OUTPUT pl=dlp pw=dwp nl=dln nw=dwn
XMP1 OUTPUT INPUT VDD VDD cp12 W=pw L=pl
XMN1 OUTPUT INPUT 0 0 cn12 W=nw L=nl
cvrc INPUT OUTPUT 1e-20 bv_max=1                 ~1101
.ENDS Inv

***** POWER SUPPLY *****
V1  VDD 0 DC 1.2V
```

FIG. 11

```
*********************************************************************
******  option summary
******
runlvl = 5     bypass = 2
 Opening plot unit= 79
 file=D:\All_in_One_lib_0A\VRC_check_study\inveter_vrc_check.pa0 info dc convergence successful at Newton-Raphson method
 Warning(x01.cvrc ): Vc =  -1.20   has exceeded Bv_max =   1.00
 Warning(x02.cvrc ): Vc =   1.20   has exceeded Bv_max =   1.00
 Warning(x03.cvrc ): Vc =  -1.20   has exceeded Bv_max =   1.00
 Warning(x04.cvrc ): Vc =   1.20   has exceeded Bv_max =   1.00
 Warning(x05.cvrc ): Vc =  -1.20   has exceeded Bv_max =   1.00
 1****** HSPICE -- K-2015.06-3 win32 (Aug 6 2015) ******
```
⎞
⎠
1201

FIG. 12

```
VDSENSE_hvn 0 205 DC 0
VGSENSE_hvn 0 206 DC 0
VSSENSE_hvn 0 207 DC 0
VBSENSE_hvn 0 208 DC 0
```

```
cvrc1 2 102 1e-20 bv_max=7
cvrc2 102 202 1e-20 bv_max=24
```
1401

```
*.DC temp -40 150 5
.dc vgn 0 vdd_1_n 0.1
.dc vgn_mvn 0 vdd_2_n 0.1
.dc vgn_hvn 0 vdd_3_n 0.1
.print i(xml.ml) i(xm2.m1) i(xm3.m1) i(xm4.m1) i(xm5.m1) i(xm6.m1) i(xm7.21) i(xm8.21) i(xm9.m1) i(xm10.1)
+ i(xm19.m1) i(xm20.m1) i(xm21.m1) i(xm22.m1) i(xm23.m1) i(xm24.m1) i(xm25.m1) i(xm26.m1) i(xm27.m1)
+ i(xm33.m1) i(x134.m1) i(xm35.m1) i(xm36.m1) i(xm37.m1) i(xm38.m1) i(xm39.m1) i(xm40.m1)
```

FIG. 14

Simulation Results:

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\* option summary
\*\*\*\*\*\*

1501

```
Warning(cvrc1 ): Vc =   -8.00   has exceeded Bv_max =    7.00
Warning(cvrc2 ): Vc =   -25.0   has exceeded Bv_max =   24.0
Warning(cvrc1 ): Vc =   -8.00   has exceeded Bv_max =    7.00
Warning(cvrc2 ): Vc =   -25.0   has exceeded Bv_max =   24.0
Warning(cvrc1 ): Vc =   -8.00   has exceeded Bv_max =    7.00
```
\*\*\*\*\*\*

\*qa pmos idsat vs. 1 test \*hspice qa netlist

\*\*\*\*\*\* de transfer curves tnom= 25.000 tepm= 25.000 \*\*\*\*\*\*
x

| temp | current xm1.m1 | current xm2.m1 | current xm3.m1 | current xm4.m1 |
|---|---|---|---|---|
| -4.000000e+001 | 2.39201e-004 | 1.24667e-002 | 1.69208e-006 | 5.57927e-005 |
| -2.000000e+001 | 2.32513e-004 | 1.24714e-002 | 1.60532e-006 | 5.57625e-005 |
| 0.000000e+000 | 2.26313e-004 | 1.24762e-002 | 1.53147e-006 | 5.57142e-005 |
| 2.000000e+001 | 2.20496e-004 | 1.24765e-002 | 1.46784e-006 | 5.56264e-005 |
| 4.000000e+001 | 2.15000e-004 | 1.24682e-002 | 1.41244e-006 | 5.54800e-005 |
| 6.000000e+001 | 2.09784e-004 | 1.24475e-002 | 1.36382e-006 | 5.52589e-005 |
| 8.000000e+001 | 2.04825e-004 | 1.24113e-002 | 1.3208Se-006 | 5.49494e-005 |
| 1.000000e+002 | 2.00108e-004 | 1.23562e-002 | 1.28268e-006 | 5.45407e-005 |
| 1.200000e+002 | 1.95626e-004 | 1.22796e-002 | 1.24862e-006 | 5.40246e-005 |
| 1.400000e+002 | 1.91373e-004 | 1.21787e-002 | 1.21813e-006 | 5.33954e-005 |

FIG. 15

COMPUTER-IMPLEMENTED METHOD OF PERFORMING VOLTAGE RULE CHECK IN AN ELECTRONIC DESIGN AUTOMATION PLATFORM

BACKGROUND OF THE INVENTION

1. Field of the Invention

The present invention relates generally to a computer-implemented method of performing voltage rule check, and more specifically, to a computer-implemented method of performing voltage rule check through inserting pseudo device with safe operating area (SOA) model setting in device model.

2. Description of the Prior Art

The design of metal-oxide-semiconductor (MOS) integrated circuit must be checked to ensure it does not violate specific electrical rule or design rule. For example, regarding MOS device, if the voltage through gate oxide layer exceeds the value that the gate oxide layer can withstand, the behavior of charge transfer may break the gate oxide layer to cause device failure or unreliability. This phenomenon is referred as gate oxide breakdown. Similar voltage breakdown may also happen in wirings between high voltage domain and low voltage domain, whose the insulating layers have different limits of withstand voltage.

Similarly, if the voltage from source to drain or the voltage from drain to source is too large to be withstood by a MOS device, large current may punch through the channel to cause device failure, even to damage the device by overheating. This phenomenon occurs very often in the design with small channel length and high voltage. Another potential failure may occur when the source voltage or drain voltage of a MOS device is too larger compared to its body voltage, wherein the junction between source and substrate or between drain and substrate would breakdown directly to cause unexpected behavior of circuit error.

The aforementioned problems may be avoided by establishing and following a rule made specifically for high-voltage electrical design. As the dimension of integrated circuit keeps shrinking and the density of transistors keeps increasing, circuit designers use automated design tools, layout tools and examination tools instead, to process these extensive, trivial and error-prone tasks. Circuit designers usually adopt commercial software of circuit simulator available in the market, such as various SPICE-like software, to perform the operation referred as design rule check (DRC) or electrical rule check (ERC) in attempt to develop the circuit following the electrical design rule and to perfect its circuit performance. To ensure the designed circuits following the electrical design rule, it is expected to examine if there is any situation violating the high-voltage design rule in these simulations.

Nevertheless, currently, these simulation software can't intuitively implement the voltage rule check between wirings in back-end-of-line (BEOL) layout, they can't simply mark the wirings belonging to different voltage domains, either. Since the voltage and current of a node in Netlist are essentially output values (may also as an input values) of a circuit simulator solving the system of equations based on Kirchhoff voltage laws (KVL) and Kirchhoff current laws (KCL), this iteration process can't check the voltage at the beginning of circuit simulation and can't check the voltage stress between a plurality of devices or between metal wirings. Therefore, users must carefully monitor the nodes of transistor to verify that no problem will occur in any situations. This disadvantage is particular obvious in the circuit architecture with a great amount of high-voltage nodes or flash memory.

It will be seen from the discussions above that it is still necessary to improve the voltage rule check for current circuit simulators in the industry, in order to provide better examination for actual design requirements.

SUMMARY OF THE INVENTION

In the light of aforementioned disadvantage in prior art, the present invention hereby provided a novel method of voltage rule check, with feature of inserting a pseudo device with safe operating area (SOA) setting and a model of the pseudo device in a netlist or a circuit schematics capable of performing check in order to check the voltage rule of specific circuit sections, thereby overcoming the problem that the approach in prior art can't mark or check the voltage stress between the wirings in back-end-of-line (BEOL) layout or between different voltage domains or different circuit blocks.

The objective of present invention is to provide a computer-implemented method of performing voltage rule check in an electronic design automation (EDA) platform, including steps of inserting a pseudo device with safe operating area (SOA) setting and a model of the pseudo device in a netlist generated by the EDA platform or in a circuit schematics of process design kit (PDK), and setting parameters of the pseudo device and the model so that the pseudo device would not affect original circuits in the netlist or in the circuit schematics, performing SOA check to the netlist or to the circuit schematics through the EDA platform, and examining warning messages triggered by the pseudo device and the model violating the SOA setting in the SOA check to find out layout sections violating the SOA setting.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute a part of this specification. The drawings illustrate some of the embodiments and, together with the description, serve to explain their principles. In the drawings:

FIG. 2 is an exemplary netlist on the program interface of HSPICE®;

FIG. 4 is the output data message of SOA check for five kinds of pseudo devices on the program interface of HSPICE®;

FIG. 5 is an example of inserting a pseudo device in a netlist in accordance with the embodiment of present invention;

FIG. 8 and FIG. 9 are several kinds of pseudo devices and relevant models implemented in the forms of SOA syntax in HSPICE® and circuit symbols in accordance with the embodiment of present invention;

FIGS. 10-12 are triggered warning messages after inserting a pseudo device between real devices in a circuit schematic and in a netlist and implementing SOA check to those devices in accordance with the embodiment of present invention;

FIGS. 13-15 are triggered warning messages after inserting pseudo devices between different voltage domains in a circuit schematic and in a netlist and implementing SOA check to those devices in accordance with the embodiment of present invention;

Figure 1:
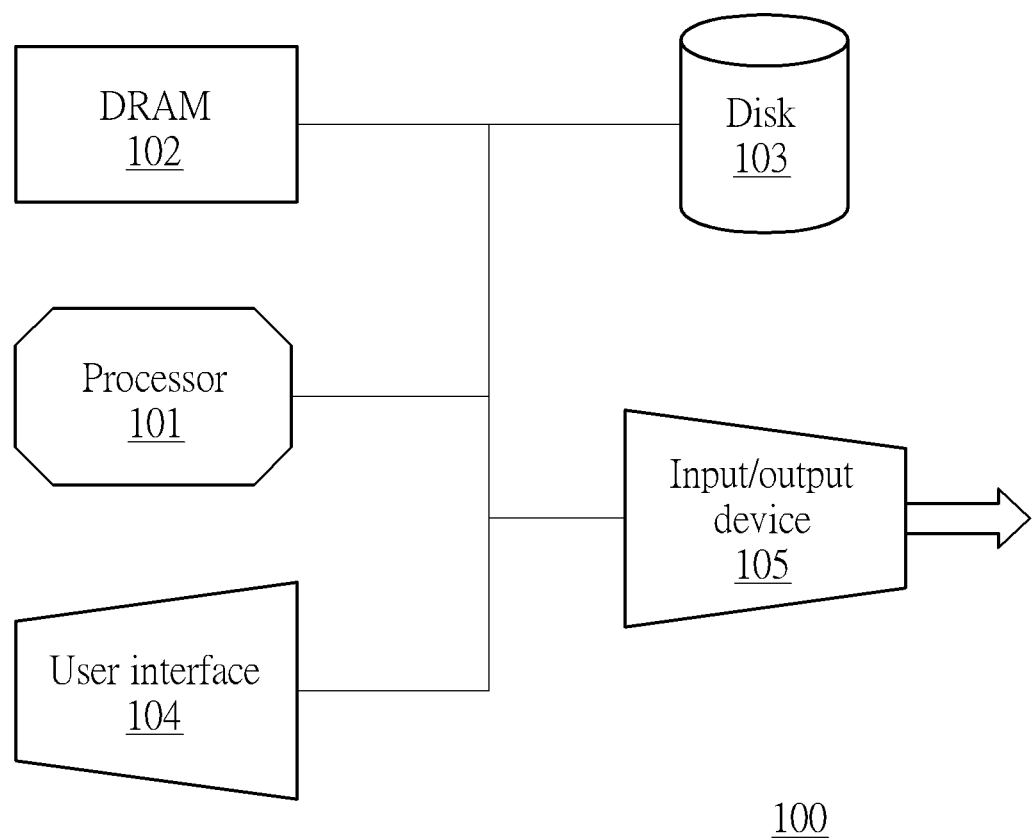
FIG. 1 illustrates a block diagram of a general purpose computer suitable for executing the computer-implemented method of the present invention.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

One or more embodiments of the present invention pertain to method for checking integrated circuit (IC) designs that are in the form of digital computer files, which files delineate features and their location in a mask layer. The checking operations determine whether such IC designs obey design rules relating to a manufacturing technology (for example, to determine whether predetermined spacing relations between features are maintained) and whether such IC designs obey electrical rules (for example, to detect possible misalignments between integrated circuit layout levels). Preferably, one or more of such embodiments are embodied in a computer implemented design rule checker (DRC)/electrical rule checker (ERC). In the following description, numerous specific details are set forth in order to provide a thorough understanding of the present invention. It will be understood, however, by one or ordinary skill in the art, that some embodiments of the present invention may be practiced without some or all of these specific details. In other instances, well known process operations will not be described in detail in order not to obscure an understanding of the present invention.

FIG. 1 illustrates an architecture of a general purpose computer architecture 100 which is able to execute the high voltage check program according to the present invention. A user enters commands through a user interface 104 consisting of devices like display, keyboard and mouse. A processor 101 reads, compute and process the computer readable code and data from random access memory DRAM 102. A high capacity secondary storage device, such as a disk drive 103, provides program code and data which can be loaded into the DRAM 102. An input/output device 105 provides connectivity to various other elements, such as networks, modems, or printers.

The computer-implemented method of present invention is generally implemented through an electronic design automation (EDA) platform installed on the aforementioned computer architecture 100. The EDA platform may include commercial circuit simulator like HSPICE® of SYNOPSYS® company, Spectre® of Cadence® company or Eldo® of Mentor® company. Regarding the present invention, please note that all circuit simulation tools, layout tools or examination tools that use device models as input basis (for example, the circuit design program capable of using files or formats like netlist or circuit schematic to perform calculation, modification or process) can apply the method of voltage rule check provided by the present invention. The tool is not limited in the aforementioned commercial software.

A part of the embodiment of present invention uses netlist to explicitly describe the implementing method of the present invention. As shown in FIG. 2, which is a netlist example of ring oscillator on the program interface of HSPICE®. In common condition, simulating schematic must be input first when performing operations relevant to the circuit simulation design. Device models like transistor, IC, capacitor, diode, resistor and inductor are provided in circuit simulator. User may choose corresponding components and connect them to form circuit. In actual simulation, the created schematic are transformed into a file referred as "netlist" by the EDA platform, wherein information like interconnections between different devices, nodes or blocks and the condition settings to be simulated or checked are described in text or numeric format in the netlist for the circuit simulator to perform the actions like reading, calculating and processing. Basically, multiple descriptive models formed by texts and numbers may be listed in the netlist, and each descriptive line defines a specific real device. For example, the term "C2_9112" in the figure represents a specific real capacitor in the circuit layout. In addition, texts in the descriptive line may also describe the actions and paths to be executed. Generally, netlists may be categorized into pre-layout netlists or post-layout netlists according to their stages in the circuit design flow. The method of voltage rule check in the present invention may be applied in these two kinds of netlists.

Figure 3:
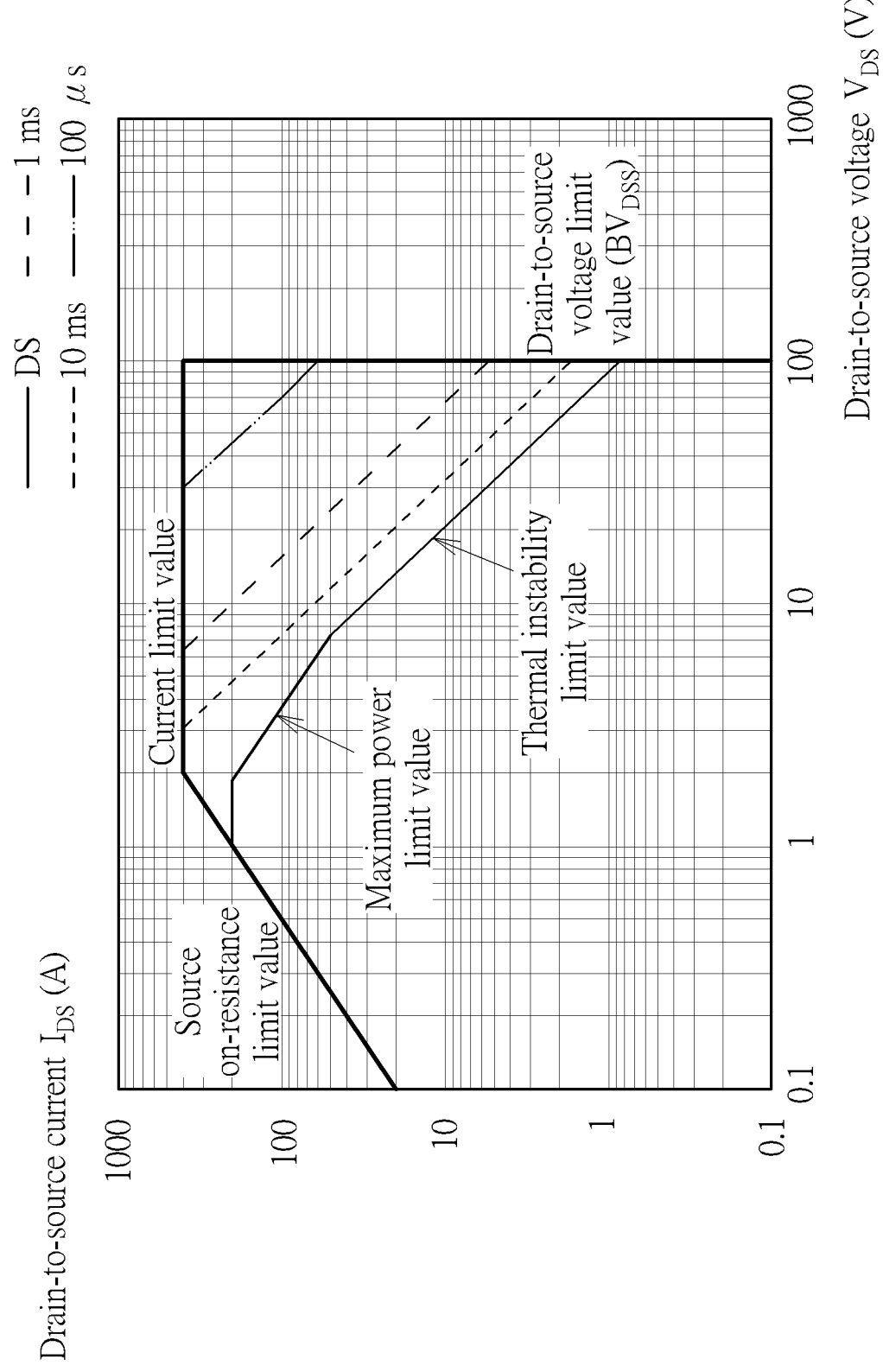
FIG. 3 is an exemplary diagram of the safe operating area (SOA)

In other aspects, the method of voltage rule check in the present invention should be implemented by cooperating with the function of safe operating area (SOA). The safe operating area (SOA) referred herein is a range of voltage-to-current condition that power semiconductor devices, ex. bipolar junction transistor (BJT), field effect transistor (FET), thyristor or insulated gate bipolar transistor (IGBT), can be operated normally without damaging. As shown in FIG. 3, which is an exemplary diagram of safe operating area (SOA) illustrating detailedly the relation of drain-to-source voltage ($V_{DS}$) vs. drain-to-source current ($I_{DS}$) that may cause a transistor failure and thermal runaway in an instantaneous operation condition at different pulse durations (100 μs to 1 ms). The curves of limit value of drain-to-source on-resistance ($R_{DS}(on)$), current, maximum power, drain-to-source voltage ($BV_{DSS}$) and thermal instability are included in the figure. The range of safe operating area (SOA) is the area defined by these curves and coordinate axes in the figure. This range combines the operational constraints in the respects of maximum voltage, maximum current, maximum dissipated power for the device. The specification of a safe operating area (SOA) is generally defined by voltage, current or frequency. It may also be configured by complex functions depending on the requirement of user and examination. For example, the voltage limit ($V_{max}$) of a metal line or the nodes thereon may be the function of spacing between metal lines, and the minimum value of the voltage limit may be the function of minimum spacing between metal lines.

With respect to the circuit simulator currently available in the industry, such as the aforementioned commercial circuit simulation programs HSPICE®, Spectre® or Eldo®, the system may send out warning messages to remind user when the terminal voltage of individual circuit component exceeds the safe operating area (SOA) configured by the user in the simulation process. This is the built-in SOA checking function. The output result of simulation analysis is usually stored in the format of binary file or text file. As shown in FIG. 4, which is an exemplary output data message of the SOA check on HSPICE® program interface. The warning message notifies in the figure that the voltage of a specific real device or node exceeding the configured voltage limit value (model parameter, such as By max).

Although current commercial circuit simulation software may provide the function of SOA checks, these SOA checks are restricted to the examination if the parameter (ex. voltage) of a single device in the netlist or circuit schematic exceeds its SOA. It can neither carry out the examination of voltage stress between a plurality of devices or metal wirings nor mark the metal lines belonging to different voltage domains. Accordingly, the present invention intends to accomplish an user-defined voltage rule check with high degree of freedom and wide coverage between a plurality of devices, voltage domains or metal lines, through the method of adding pseudo devices or relevant models in the aforementioned safe operating area (SOA) check implemented in an electronic design automation (EDA) platform.

More specifically, the pseudo device referred in the present invention is a dummy object that does not correspond to any real device in integrated circuit. However, a model of pseudo device assigned with the parameter settings relevant to the SOA may implement the voltage rule check (VRC) necessary in the present invention. The aforementioned dummy object may be formed by texts in the netlist, schematic symbols or layout, with various SOA settings parameterized in the model of pseudo device through abstraction layers. Identical pseudo devices may share one model. Particularly, it may be presented by a layout of non-physical drawing layer if the layout object is involved.

Please refer now to FIG. 5, which is an example of inserting a pseudo device model in a netlist in accordance with the embodiment of present invention, wherein every line in the netlist represents different real devices, nodes or blocks in a circuit schematic. For example, the component C2_9112 represents a specific real capacitor in the circuit layout. The netlist shown in FIG. 5 is generally the same as the one shown in FIG. 2 with the difference that the netlist in FIG. 5 is inserted with two executive lines 501, 502, which represent respectively two pseudo capacitors Cvrc100, Cvrc200 in the embodiment of present invention. Some pin texts or labels in the executive lines 501, 502, such as "Cvrc100 VDDCORE EN" and "Cvrc200 VSSCORE EN", may be identified by the program to execute the examination of the pseudo device model when the SOA check (which is set herein as 2V by "bv_max=2") is running and may trigger warning messages when the SOA setting is violated, so that the layout positions or netlist sections violating the SOA setting may be recognized through these pin texts or labels. Alternatively, the identified pin texts or labels may belong to different subnets in order to find out the voltage warnings between the subnets or functional blocks (ex. between different voltage domains 1.8V and 6V).

According to this embodiment, inserting pseudo capacitor model between the nodes to be checked in the netlist may examine the voltage difference between the nodes in the SOA check. When the voltage difference exceeds the SOA setting defined for these pseudo device models, for example when the voltage difference exceeds 2V (bv_max=2), the examination will list the warning messages in follow-up output data.

The pseudo device and relevant model provided in the present invention may include various devices that can be input through circuit simulator, including pseudo capacitor, pseudo resistor, pseudo complementary metal oxide semiconductor (CMOS), pseudo bipolar junction transistor (BJT) or pseudo diode. To insert a pseudo device model in a netlist, the pseudo device model to be inserted may be configured in a model card in advance. The model card is a set of multiple models. Those pseudo device models may be inserted into specific positions between the run decks in the netlist by directly calling the model card. It may also be inserted by feeding in instance parameters from the netlist through default SOA interface. Alternatively, the pseudo device with SOA settings may be added by manually modifying the netlist through program interface.

Figure 6:
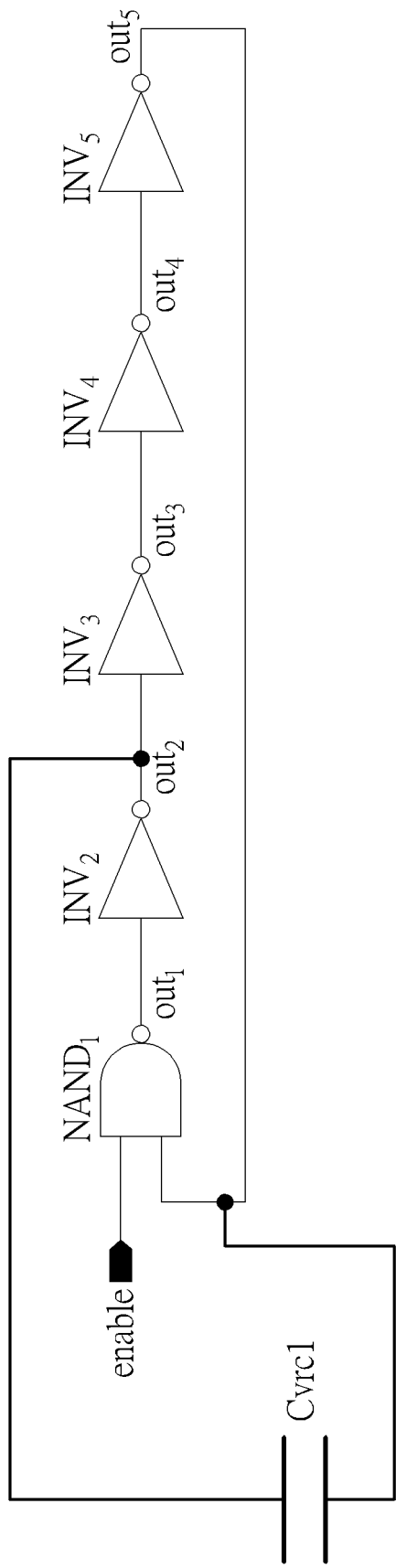
FIG. 6 is an example of inserting a pseudo device in a circuit schematic in accordance with the embodiment of present invention.
Figure 7:
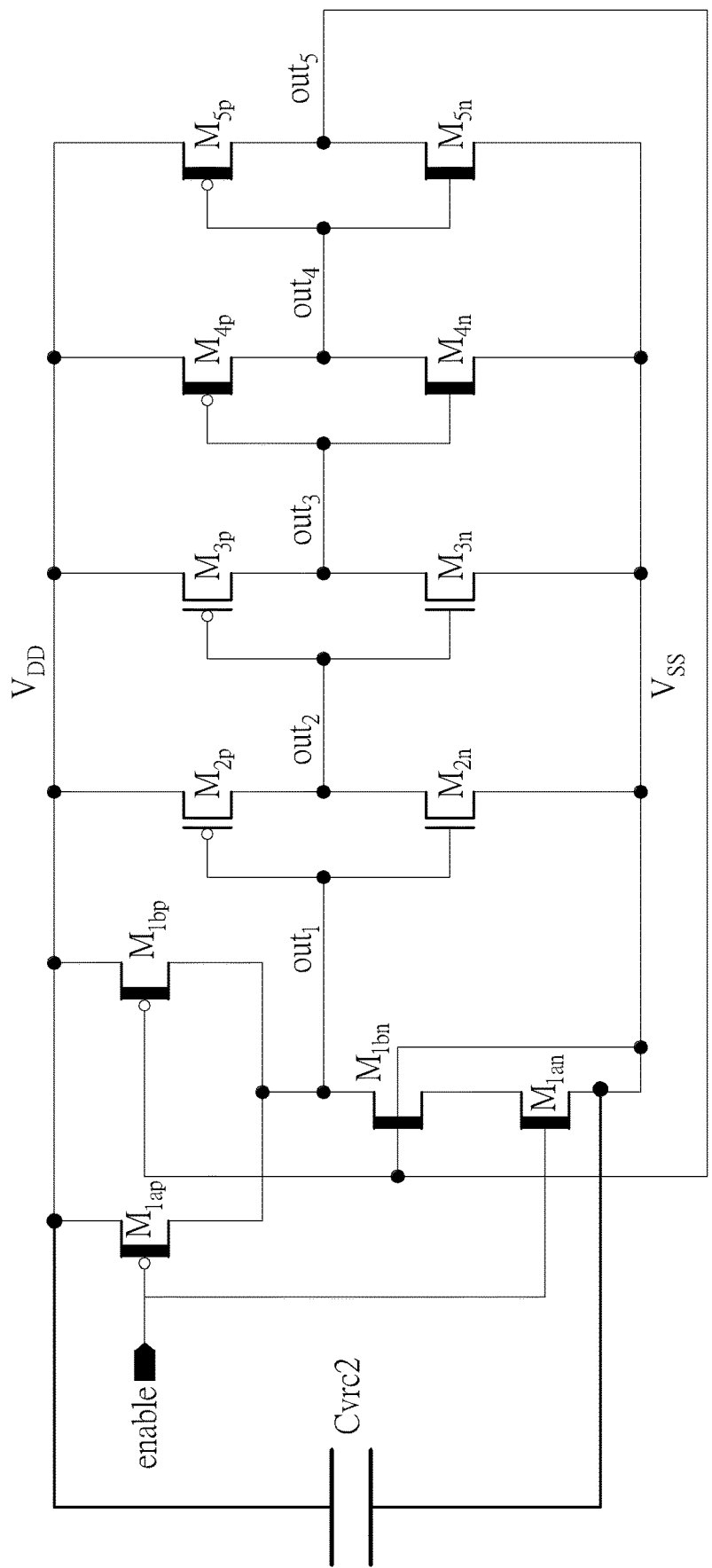
FIG. 7 is another example of inserting a pseudo device in a circuit schematic in accordance with the embodiment of present invention.

In addition to netlist, the pseudo device model of present invention may also be inserted in the environment of circuit schematic. Please refer to FIG. 6, which is an example of inserting a pseudo device model in a circuit schematic in accordance with the embodiment of present invention. In the example of netlist above, the pseudo device model exists in the netlist and is implemented in the form of executive lines consisting of texts and numbers. In this embodiment, the pseudo device model is directly inserted in the circuit schematic to be examined in the form of schematic symbols, especially the schematic symbols compatible to the process design kit (PDK). For example, in the embodiment of FIG. 6, user may see the circuit schematic of a layout on an user interface through process design kit, such as the real devices $NAND_1$, $INV_2$, $INV_3$, $INV_4$ and $INV_5$ connecting in series shown in the figure. User may also directly call the SOA symbols in the process design kit to insert pseudo device models at specific nodes or between nodes in the circuit schematic. Take similar pseudo capacitor model Cvrc1 as an example, the pseudo capacitor model Cvrc1 is inserted to the position between the node $out_2$ and node $out_5$ in the circuit schematic through the process design kit, so it may be examined whether the voltage difference between the node $out_2$ and node $out_5$ violates the rule or not when performing SOA check. Similarly, please refer to FIG. 7, take pseudo capacitor model Cvrc2 as an example, the pseudo capacitor model Cvrc2 is inserted to the position between the node $V_{DD}$ and node $V_{SS}$ in the circuit schematic through the process design kit, so it may be examined whether the voltage difference between the node $V_{DD}$ and node $V_{SS}$ violates the rule or not when performing SOA check.

Figure 8:
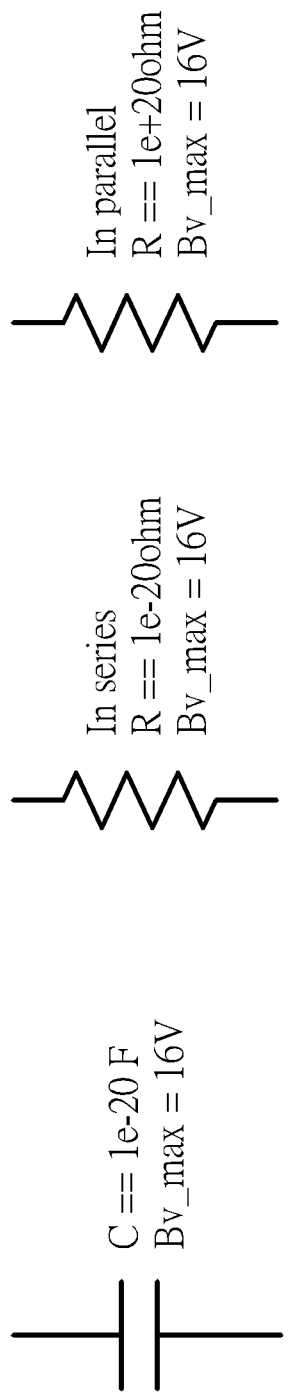

In the present invention, the pseudo devices and relevant models compatible for inserting in the SOA check are not limited to the ones shown in the embodiment above, they may also include pseudo resistor, pseudo MOSFET, pseudo BJT and pseudo diode. Please refer now to FIG. 8, which illustrates several kinds of pseudo devices and relevant models implemented in the forms of SOA syntax in HSPICE® and the schematic symbols in accordance with the embodiment of present invention.

With respect to pseudo capacitor model, the pseudo capacitor model may be considered as an open-circuit with extremely small capacitance (ex. $1*10^{-20}$ F) when calculating DC operating point, so that the inserted pseudo capacitor model would not affect the electrical property of original circuit. In the SOA check, the voltage limit values of two terminals of the pseudo capacitor model may be setup as a default value like 16V (Bv_max=16V). This voltage limit value may also be a function of a set of instance parameters. For example, the voltage limit value is equal to the spacing of metal lines multiplied by a constant of proportionality k. The parameters may be input through the interface of netlist to calculate and setup the SOA limit values.

With respect to pseudo resistor and relevant models, the connection types may include series and parallel. Regarding the pseudo resistor models connecting in series, their setup resistances R may be extreme small (ex. $1*10^{-20}$ ohm), while the setup resistances R for those pseudo resistor models connecting in parallel may be extreme large (ex. $1*10^{20}$ ohm). In this way, no matter connecting in series or parallel, the inserted pseudo resistor model would not cause noticeable impact to the DC electrical property of original circuit. In the SOA check, the voltage limit values of two terminals of the pseudo resistor model may be setup as a default value like 16V (Bv_max=16V). This voltage limit value may also be a function of a set of instance parameters.

With respect to pseudo MOSFET and relevant models, the MOSFET is a device with four terminals, including six kinds of terminal voltages Vgs, Vgd, Vgb, Vbd, Vbs and Vds for monitoring and checking. As shown in FIG. 9, through manual modification or calling the model card 901 for simulating MOSFET, the SOA settings for six terminal voltages may be inserted between the run decks in the netlist. As shown in the figure, the maximum value of the six terminal voltages is setup as 1V. The setup threshold voltage Vth of pseudo MOSFET may be extremely large (ex. 100V) to prevent the pseudo device turned active and interfering original circuit. The terminal voltages of pseudo BJT and pseudo diode, such as Veb, Vec and Vbc, may also be setup in the netlist or circuit schematic in the same way to accomplish the SOA check.

Figure 10:
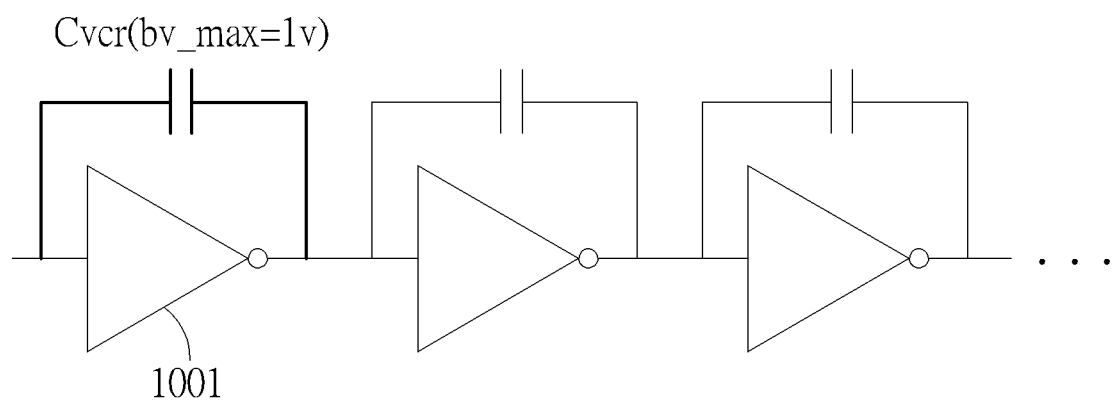

Please refer now to FIG. 10 to FIG. 12. The real device of a single level inverter is taken as an example to describe the actual practice and result of implementing a SOA check by inserting the pseudo devices and relevant models of the present invention. Firstly, a schematic of ring oscillator formed by several inverters 1001 in series is shown in FIG. 10. A pseudo capacitor device Cvcr is inserted between the input and output of each inverter 1001 to examine the output/input voltage difference of every level of the ring oscillator, with a setup voltage limit value 1V (bv_max=1V). When a given supply voltage is 1.2V, the voltage stress (1.2V) between the input and output would exceed the setup voltage limit value (1V), so that the SOA warning message will be triggered when executing SOA check. In FIG. 11, it can be seen that the pseudo device model 1101 with SOA setting (bv_max=1) corresponding to the pseudo capacitor Cvcr is inserted in the run deck of netlist. In FIG. 12, it can be seen that the warning message 1201 triggered by the pseudo device model 1101 appears in the output result of SOA check. Through the examination of the warning message 1201 triggered by the pseudo device model 1101 in the SOA check, the layout position violating the SOA setting may be recognized, i.e. the position where the pseudo capacitor Cvcr inserted.

Figure 13:
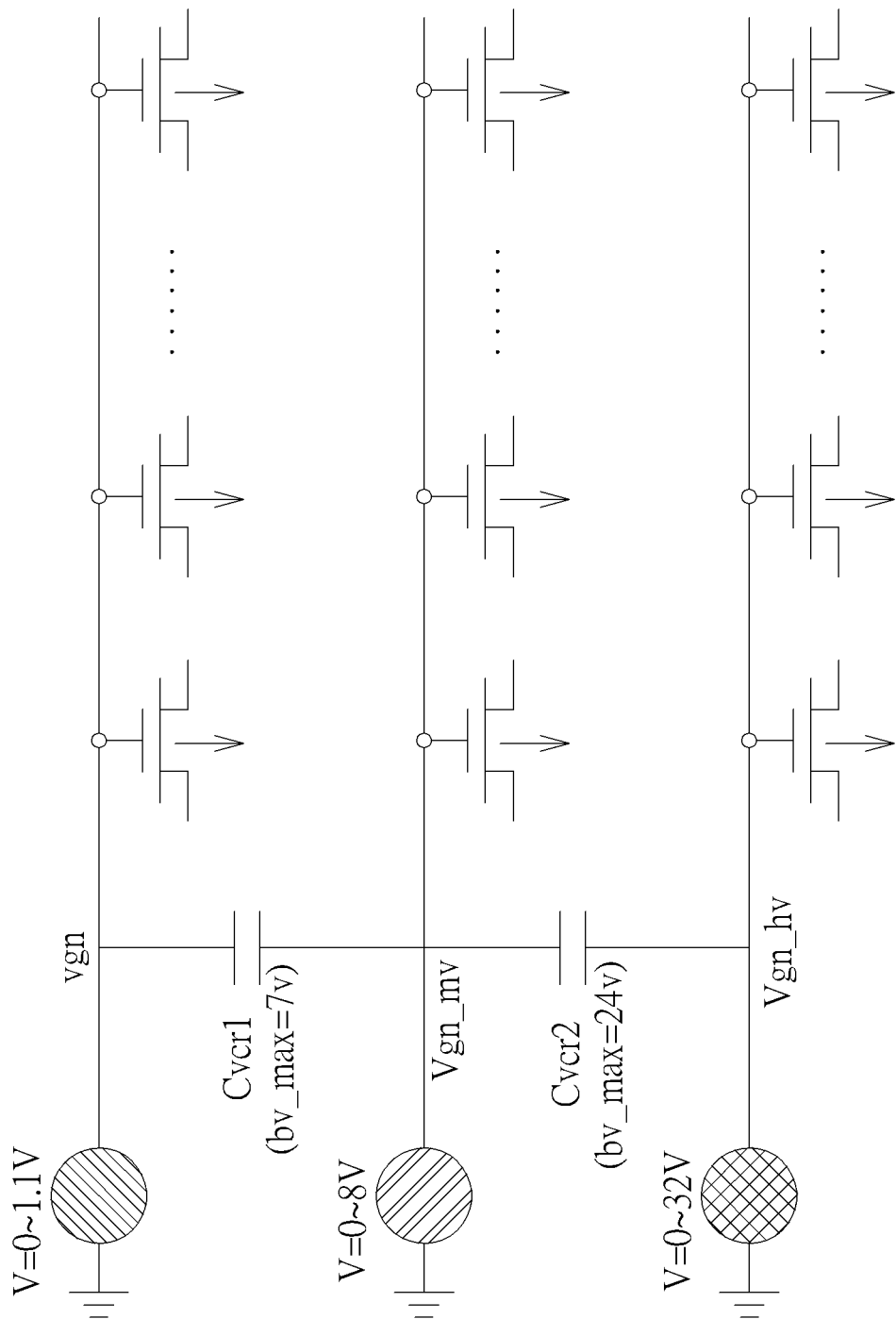

Please refer now to FIG. 13 to FIG. 15, which illustrate an actual practice and result of implementing a SOA check between different voltage domains through the pseudo devices and relevant models provided by the present invention. Firstly, a schematic of three different voltage domains including 0~1.1V, 0~8V and 0~32V are shown in FIG. 13, wherein a pseudo capacitor Cvcr1 is inserted between the voltage domains 0~1.1V and 0~8V and a pseudo capacitor Cvcr2 is inserted between the voltage domains 0~8V and 0~32V by the aforementioned method of present invention in order to examine the voltage difference between those voltage domains. The setup voltage limit values of two pseudo capacitors Cvcr1 and Cvcr2 are 7V (bv_max=7V) and 24V (bv_max=24V) respectively, with the same setup capacitance $1*10^{-20}$ F that would not noticeably affect the performance of original circuit. It can be seen from FIG. 14 that the pseudo device models 1401 corresponding to the pseudo capacitors Cvcr1 and Cvcr2 with the SOA settings (bv_max=7 and bv_max=24) are inserted in the run decks of netlist. In FIG. 15, it can be seen that the warning message 1501 triggered by the pseudo device model 1401 appears in the simulation result of the SOA check.

In addition to the aforementioned pre-layout netlist, post-layout netlist and the circuit schematic of process design kit (PDK), the action of inserting pseudo devices and relevant models in the present invention may also be implemented in in-layout stage. For example, the pseudo device may be inserted into the layout patterns by using auto place and route tool (APR) in in-layout stage, and they may exist in the GDS file in the form of texts or labels.

Figure 16:
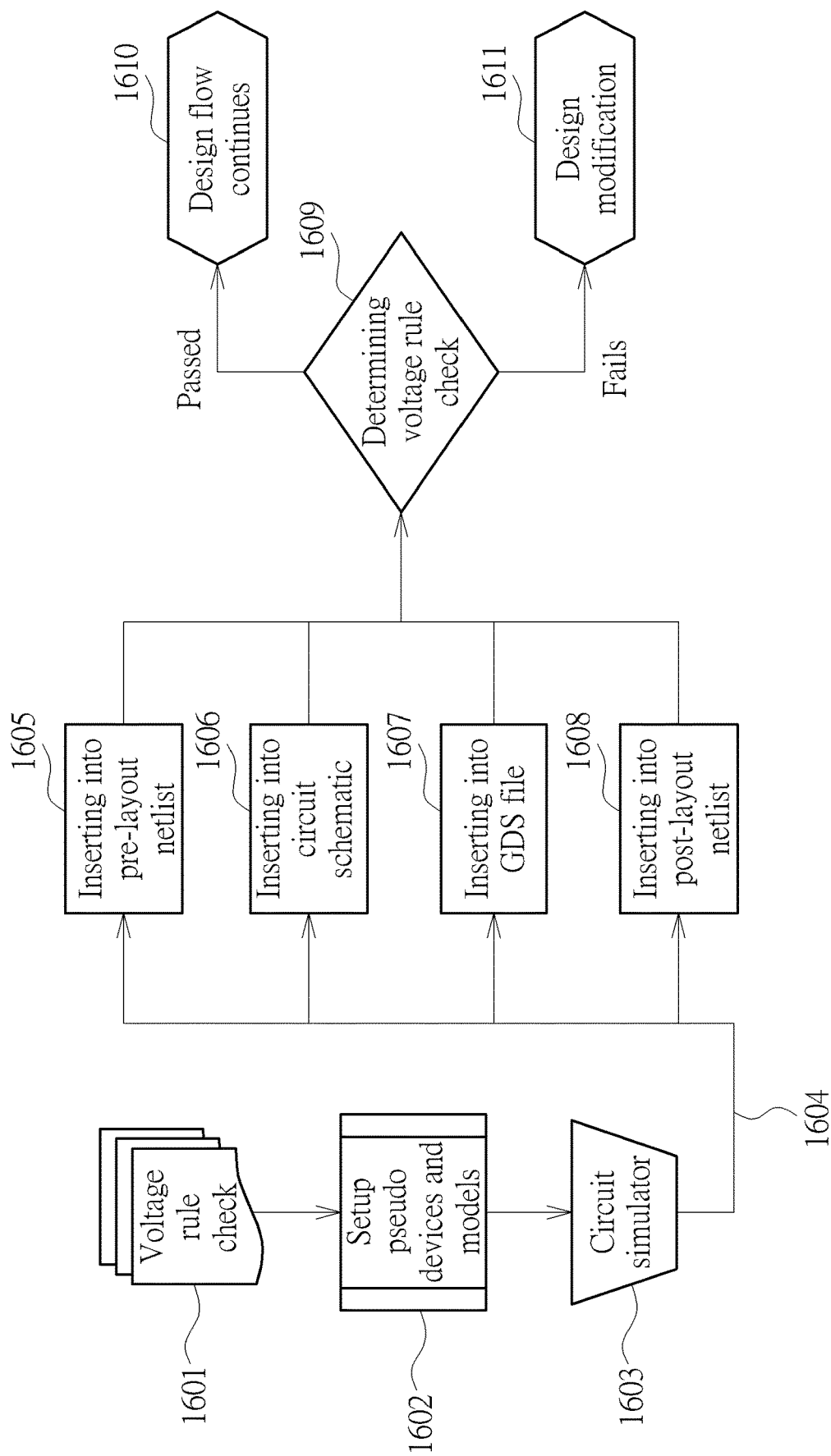
FIG. 16 is a flowchart of a computer-implemented method of performing voltage rule check in an electronic design automation (EDA) platform in accordance with the embodiment of present invention.

Please refer now to FIG. 16. In summary of the description of embodiments provided above, FIG. 16 illustrates conclusively a flow of computer-implemented method of performing voltage rule check in an electronic design automation (EDA) platform in accordance with the embodiments of present invention. Firstly, in step 1601, perform a voltage rule check in an electronic design automation (EDA) platform, which may be implemented through the SOA function of the platform. Next, in step 1602, user setups required pseudo devices and relevant models according to the voltage rule check to be performed, which may include the features like netlist texts, schematic symbols or layouts, wherein various corresponding SOA settings are parameterized and assigned in the models of the pseudo devices. Next, in step 1603, insert the pseudo devices and relevant models having the configured SOA parameter settings into the netlist or circuit schematics. The process will enter the loop of voltage rule check at this time (1604). This loop of voltage rule check may be implemented in various stages of the circuit design, including of inserting in pre-layout netlist (1605), inserting in circuit schematic (1606), inserting in GDS file (1607) or inserting in post-layout netlist. Next, in step 1609, performing the SOA check through a circuit simulator, wherein the aforementioned specific voltage rule check are also executed in the process. If the voltage rule check is passed, the circuit design flow will continue (1610). IF the voltage rule check fails, the warning message triggered by the pseudo devices or relevant model violating the SOA settings will be examined in order to find out the layout position violating the SOA settings and to modify its circuit design accordingly (1611).

Figure 17:
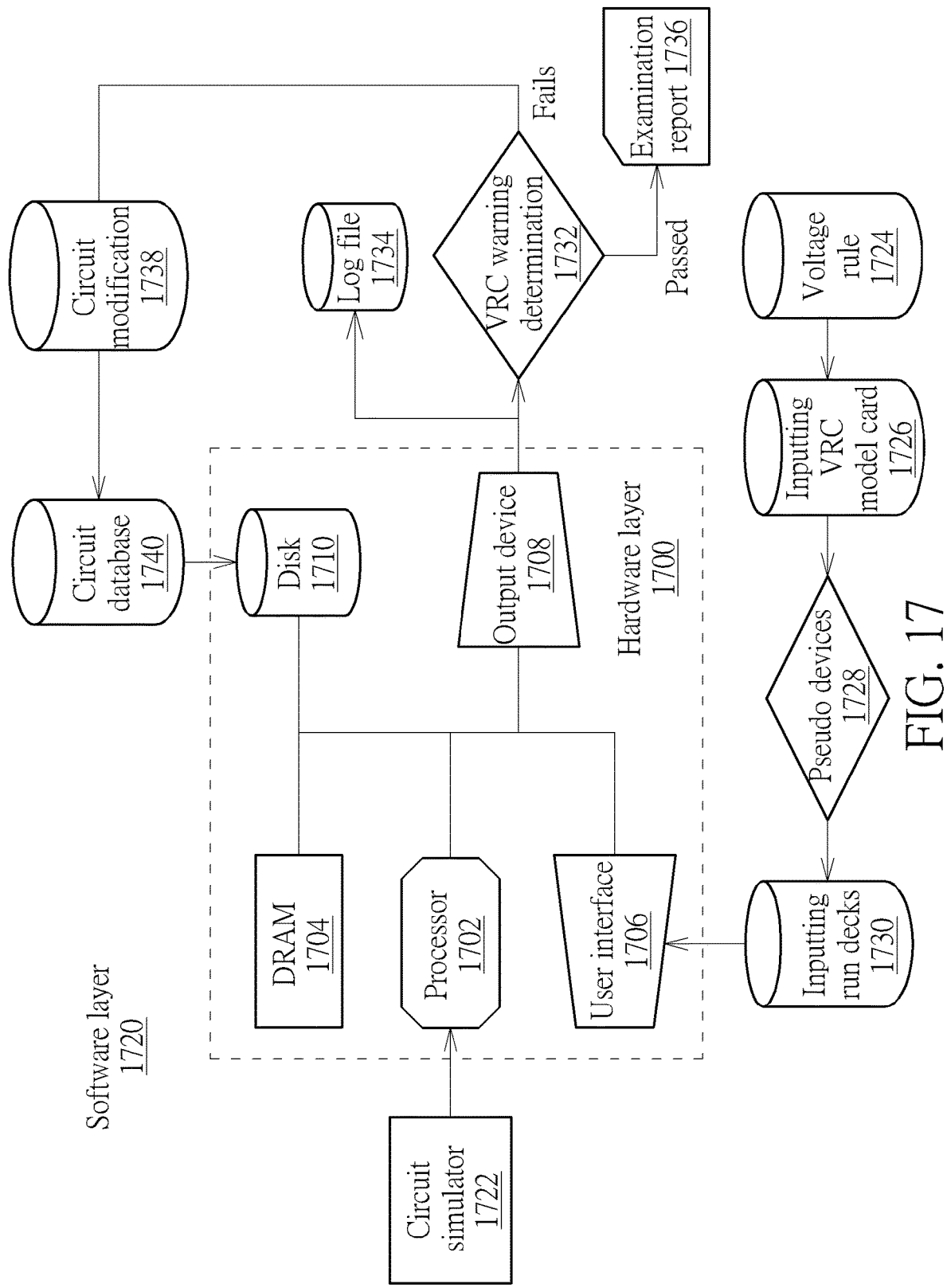
FIG. 17 is a block diagram of system for the computer-implemented method of performing voltage rule check in hardware layers and software layers in accordance with the embodiment of present invention.

Please refer now to FIG. 17, which is a block diagram of the system for the computer-implemented method of performing voltage rule check in a hardware layer and a software layer in accordance with the embodiment of present invention, wherein the hardware layer 1700 represents all of the real components to perform the computer-implemented method of present invention. These components are generally the same as the general purpose computer architecture 100 shown in FIG. 1. The software layer 1720 represents non-physical components stored in computer-readable mediums in the form of data or information capable of being calculated or processed by the computer. Firstly, the overall voltage rule check is performed based on a circuit simulator 1722. The circuit simulator 1722 may be commercial software of circuit simulator available in the market, such as various SPICE-like software capable of performing circuit simulation for analog or mixed signal. The instructions and data output by the circuit simulator 1722 are sent to the hardware layer 1700 and are calculated and processed by a processor 1702. DRAM 1704 in the hardware layer 1700 may temporarily store the data and information to be processed and may be accessed in the process flow.

Refer still to FIG. 17. The voltage rule 1724 to be executed in the method is implemented by inputting the model card 1726 with aforementioned parameters of voltage rule check (VRC) in the circuit simulator 1722. The file of circuit design to be simulated will be input first in the circuit simulator 1722, which may include the netlist derived from circuit schematic and/or layout. The model card 1726 or the file of process design kit (PDK) describes the property of individual real devices to be integrated in this circuit design. The required pseudo device models 1728 are setup at this time in the model card in advance, and these pseudo device models may be input or inserted into specific positions between the run decks 1730 in the netlist by directly calling the model card. The action of inputting model card and inputting run decks may be performed by the user interface 1706 of hardware layer 1700 such as input devices like keyboard and mouse and the operational interface of the program, to execute the required voltage rule check. The warning result of determination 1732 for the voltage rule check in the method will be transmitted and displayed through output devices like displayer, network, modem or printer. At this time, the error message notifying that the voltage rule check is violated may be stored in the form of texts in a LOG file 1734. If the voltage rule check is passed, the overall examination report 1736 will be generated by the system and displayed through the output devices 1708, which may also include the file compatible to CSV (comma-separated value) format. If the voltage rule check fails, the warning message triggered by the pseudo devices and models violating the voltage rule check may be examined through the output device 1708 to recognize the layout positions that violate the SOA settings and to perform the circuit modification 1738 accordingly focusing on these positions. The modified circuit data will be input into circuit database 1740 and stored in the mass storage device, ex. disk 1710, in the hardware layer 1700. The disk 1710 may further provide codes and data relevant to the compute-implemented method of present invention to be loaded into DRAM 1704 for relevant calculation and process by the system during the executing stages of the method.

According to the various embodiments described above, the method of voltage rule check provided by the present invention may freely examine the voltages of specific circuit sections at nodes, between multiple nodes or between the voltage domains in the SOA check through the method of inserting pseudo devices or relevant models with SOA settings in the netlist and circuit schematic, thereby overcoming the problem that the approach in prior art can't mark or check the voltage stress between the wirings in BEOL layout or between different voltage domains or different circuit blocks, and its range may include but be not limited to positions between wirings, devices, layers or functional blocks. Also, it may perform the actions like design optimization with the external tool of the circuit simulator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer-implemented method of performing voltage rule check in an electronic design automation (EDA) platform, including:
    inserting a pseudo device with a safe operating area (SOA) setting and a model of said pseudo device between two nodes predetermined to be checked in a netlist generated by said EDA platform or in a circuit schematic of a process design kit (PDK), wherein said SOA setting comprises user-defined terminal voltage limits of said pseudo device;
    setting parameters of said pseudo device and said model so that said pseudo device would not affect original circuits in said netlist or in said circuit schematic, wherein said pseudo device does not correspond to any real device in said original circuits;
    performing an SOA check to said netlist or to said circuit schematic through said EDA platform; and
    examining warning messages triggered by said pseudo device and said model violating said SOA setting in said SOA check to find out layout sections violating said SOA setting.

2. The computer-implemented method of performing voltage rule check in an electronic design automation (EDA) platform of claim 1, wherein said pseudo device and said model are set up in a model card in a form of pin texts, labels or subnets, and said step of inserting a pseudo device with safe operating area (SOA) setting and a model of said pseudo device comprises calling said model card to insert said pseudo device and said model in said model card between run decks in said netlist.

3. The computer-implemented method of performing voltage rule check in an electronic design automation (EDA) platform of claim 2, wherein said netlist is a pre-layout circuit simulation netlist or a post-layout circuit simulation netlist.

4. The computer-implemented method of performing voltage rule check in an electronic design automation (EDA) platform of claim 1, wherein said step of inserting a pseudo device with safe operating area (SOA) setting and a model of said pseudo device comprises calling a symbol of said pseudo device in said process design kit (PDK) to insert said symbol of pseudo device between circuits to be checked in said schematic.

5. The computer-implemented method of performing voltage rule check in an electronic design automation (EDA) platform of claim 1, wherein said pseudo device is inserted to an exported GDS file by an auto place and route tool (APR).

6. The computer-implemented method of performing voltage rule check in an electronic design automation (EDA) platform of claim 1, wherein said pseudo device comprises a pseudo capacitor, pseudo resistor, pseudo complementary metal oxide semiconductor (CMOS), pseudo bipolar junction transistor (BJT) or pseudo diode.

7. The computer-implemented method of performing voltage rule check in an electronic design automation (EDA) platform of claim 1, wherein said electronic design automation (EDA) platform is a circuit simulator, comprising Hspice®, Spectre® or Eldo®.

8. The computer-implemented method of performing voltage rule check in an electronic design automation (EDA) platform of claim 7, wherein said pseudo device is a pseudo capacitor with an extremely small setup capacitance, so that inserted said pseudo capacitor would not affect an electrical property of said original circuits.

9. The computer-implemented method of performing voltage rule check in an electronic design automation (EDA) platform of claim 7, wherein said pseudo device is a pseudo resistor in series with an extremely small setup resistance, so that inserted said pseudo resistor would not affect an electrical property of said original circuits.

10. The computer-implemented method of performing voltage rule check in an electronic design automation (EDA) platform of claim 7, wherein said pseudo device is a pseudo resistor in parallel with an extremely large setup resistance, so that inserted said pseudo resistor would not affect an electrical property of said original circuits.

11. The computer-implemented method of performing voltage rule check in an electronic design automation (EDA) platform of claim 7, wherein said pseudo device is MOSFET with an extremely large threshold voltage, so that inserted said MOSFET would not affect an electrical property of said original circuits.

\* \* \* \* \*